(12) United States Patent
Udagawa

(10) Patent No.: US 6,982,753 B1
(45) Date of Patent: Jan. 3, 2006

(54) IMAGE PICKUP APPARATUS

(75) Inventor: Yoshiro Udagawa, Miyashiro-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/442,835

(22) Filed: Nov. 18, 1999

(30) Foreign Application Priority Data

Nov. 25, 1998 (JP) .................................. 10-349328

(51) Int. Cl.
   *H04N 9/73* (2006.01)
(52) U.S. Cl. .................................. 348/223.1; 348/222.1
(58) Field of Classification Search .. 348/222.1–228.1, 348/223.1–229.1, 370, 371, 655
   See application file for complete search history.

(56) References Cited

U.S. PATENT DOCUMENTS

| | | | | |
|---|---|---|---|---|
| 4,584,598 A | * | 4/1986 | Kutaragi .................. 348/226.1 |
| 5,170,069 A | * | 12/1992 | Sakai ........................ 307/43 |
| 5,260,774 A | | 11/1993 | Takayama .................... 358/29 |
| 5,617,139 A | * | 4/1997 | Okino ...................... 348/223.1 |
| 5,691,772 A | * | 11/1997 | Suzuki ..................... 348/223.1 |
| 6,411,331 B1 | * | 6/2002 | Sansom-Wai et al. ... 348/223.1 |

* cited by examiner

*Primary Examiner*—David L. Ometz
*Assistant Examiner*—Yogesh Aggarwal
(74) *Attorney, Agent, or Firm*—Morgan & Finnegan, LLP

(57) ABSTRACT

An image pickup method and apparatus which can realize accurate white balance reproduction and shorten the loop processing time for white balance processing are provided. A system controller selects at least one of the white balance coefficient calculated from image signal data before image pickup, the white balance coefficient calculated from image signal data after image pickup, and the result obtained by computing the two white balance coefficients, and displays at least one of processed data subjected to signal processing using the selected white balance coefficient on a display unit.

7 Claims, 5 Drawing Sheets

FIG. 4

| | DISPLAY CIRCUIT ON | DISPLAY CIRCUIT OFF |
|---|---|---|
| NO STROBE | (1) INITIAL VALUE : WBstd<br>COEFFICIENT : WBsw1 | (2) INITIAL VALUE : WBstd<br>COEFFICIENT : WBsw2 |
| STROBE | (3) INITIAL VALUE : (WBsw1+WBf1)/2<br>COEFFICIENT : (WBsw2+WBf1)/2 | (4) INITIAL VALUE : (WBstd+WBf1)/2<br>COEFFICIENT : (WBsw2+WBf1)/2 |

IMAGE PICKUP APPARATUS

BACKGROUND OF THE INVENTION

1. Field of the Invention

The present invention relates to an image pickup method and apparatus and a storage medium storing a control program for controlling the image pickup apparatus.

2. Related Background Art

Conventionally, white balance processing is performed by the following method in a digital camera such as an image pickup apparatus.

As shown in FIG. 6, when the shutter (not shown) is depressed to the first stroke (SW1), white balance processing (WB processing) is started by using a predetermined white balance coefficient as an initial value. After a final white balance coefficient is determined upon convergence and completion of this processing, the shutter can be depressed to the second stroke (SW2). An image signal is stored in the memory at the timing at which SW2 is closed. The data stored in the memory is raw data output from a CCD (charge-coupled device) or the like. This data is subjected to signal processing in a so-called signal processing circuit to become recording data. The recording data is recorded on a recording medium. The white balance coefficient (WB coefficient) immediately before closing of SW2 is obtained as a parameter to be used for processing for the recording data and set in the signal processing circuit. This parameter is recorded on the recording medium after the raw data stored in the memory is subjected to signal processing.

In the above conventional apparatus, when image pickup is to be performed by using a strobe, strobe light is emitted instantaneously at the timing of SW2. Consequently, the above processing after SW1 in FIG. 5 (i.e., continuous white balance detection) cannot be performed. For this reason, a fixed white balance coefficient for predetermined strobe emission is set. In some case, therefore, external light influences image pickup stronger than strobe light depending on the object distance, and an object located at a long distance and irradiated with reddish tungsten light is processed into a red image.

SUMMARY OF THE INVENTION

The present invention has been made in consideration of the above problem in the prior art, and has as its object to provide an image pickup method and apparatus which can realize accurate white balance reproduction and shorten the loop processing time for white balance processing.

It is the second object of the present invention to provide a storage medium storing a control program that can smoothly control the image pickup apparatus of the present invention.

In order to achieve the first object, according to the first aspect of the present invention, there is provided an image pickup method comprising at least the first detection step of calculating a white balance coefficient from image signal data before image pickup, and the second detection step of calculating a white balance coefficient from image signal data after image pickup, characterized in that the method further comprises the selection step of selecting at least one of two types of detection results obtained in the first and second detection steps and a computation result obtained by computing the two types of detection results, the signal processing step of performing signal processing by using one of the detection result and computation result, selected in the selection step, and the output step of outputting at least one of processed data subjected to signal processing in the signal processing step.

In order to achieve the first object, according to the second aspect of the present invention, in the image pickup method according to the first aspect, the output step is characterized by displaying an output.

In order to achieve the first object, according to the third aspect of the present invention, in the image pickup method according to the first aspect, the output step is characterized by recording an output.

In order to achieve the first object, according to the fourth aspect of the present invention, in the image pickup method according to the first aspect, the first detection step is characterized by a step of using live image data used for framing before image pickup, and the second step is characterized by a step of using still image data obtained by image pickup and stored in a memory.

BRIEF DESCRIPTION OF THE DRAWINGS

FIG. 4 is a view showing the relationship between the initial value in white balance processing and the generation timing of a white balance coefficient for signal processing for recording image data in each image pickup mode of the image pickup apparatus according to the embodiment;

DETAILED DESCRIPTION OF THE PREFERRED EMBODIMENTS

Each embodiment of the present invention will be described below with reference to the accompanying drawings.

The first embodiment of the present invention will be described first.

Figure 1:
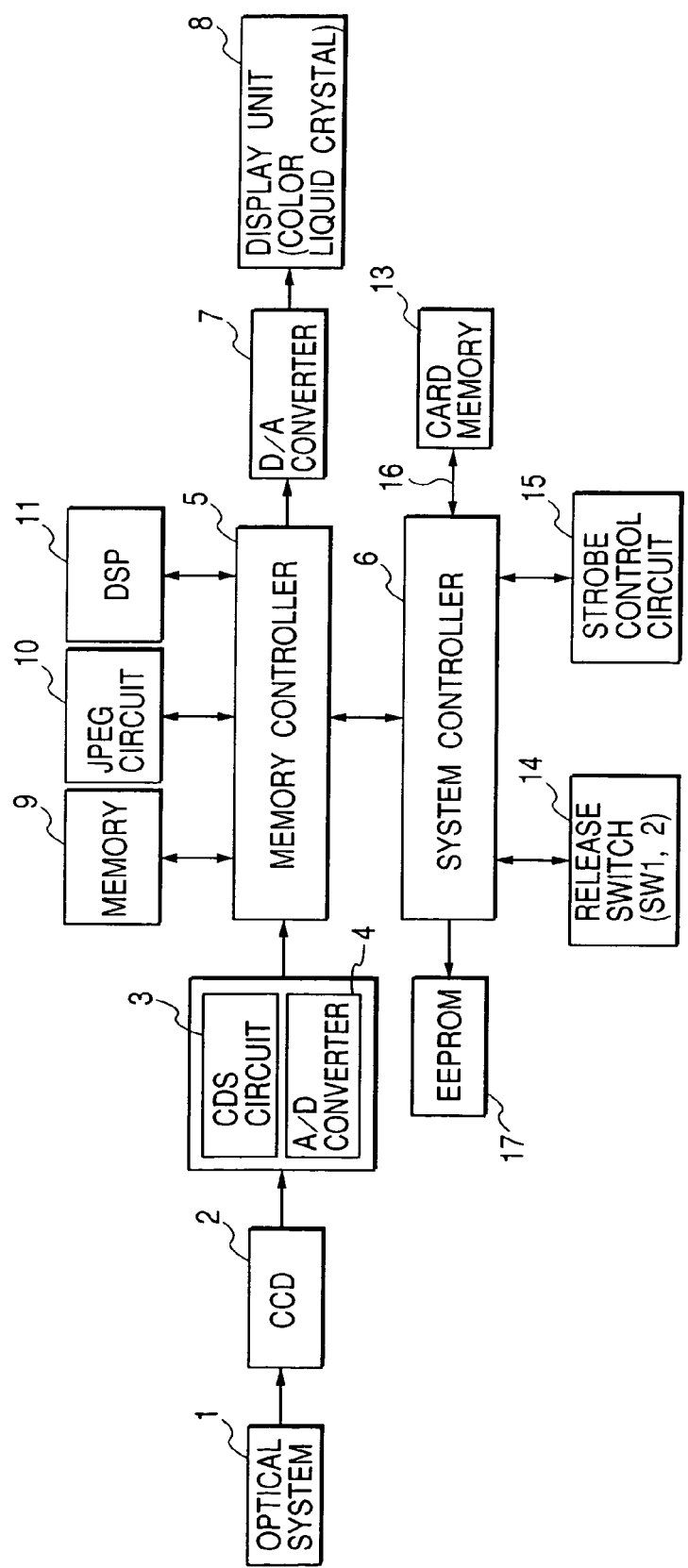
FIG. 1 is a block diagram showing the system configuration of an image pickup apparatus according to an embodiment of the present invention.

FIG. 1 is a block diagram showing the system configuration of a digital still camera as an image pickup apparatus according to an embodiment of the present invention. Referring to FIG. 1, this camera is comprised of an optical system 1 including a lens and the like, a photoelectric conversion element (CDD in this embodiment) 2 for converting an optical signal from the optical system 1 into an electrical signal, a CDS (Correlation Double Sampling) circuit 3 for converting an output signal from the CCD 2 into a video signal, an A/D converter 4 for converting an analog signal output from the CDS circuit 3 into a digital signal, a memory controller 5 for controlling a memory 9 (to be described later), a system controller 6 for generating a signal for driving a CCD driver (not shown) and controlling the memory controller 5, a D/A converter 7 for converting a digital signal output from the memory controller 5 into an analog signal, a display unit 8 such as a color liquid crystal display for displaying data, picked image, and the like, the memory 9 such as a RAM used to store image data, a compression circuit 10 for compressing an image signal by a compression scheme such as JPEG, a DSP (Digital Signal Processor) 11 for performing various signal processes such as a color signal processing and luminance signal processing, an EEPROM (Electrically Erasable Programmable Read Only Memory) 17 used to hold a white balance coefficient (WBstd) for a standard light source, a white balance coefficient (WBf1) for a first strobe light, a white balance coefficient (WBf2) for a second strobe light, and the like, a card memory 13 in which image-picked data and the like are stored, a release switch 14 as a two-stroke switch which is depressed to the first stroke to turn on the first switch SW1 and is depressed to the second stroke to turn on the second switch SW2, and a strobe control circuit 15 for controlling a strobe (not shown).

Referring to FIG. 1, an object image (not shown) is formed on the image pickup surface of the CCD 2 through the optical system 1. The electric signal generated by photoelectric conversion performed by the CCD 2 is input as an output signal form the CCD 2 to the CDS circuit 3 and A/D converter 4 to be converted into a video signal and digital signal. Thereafter, the resultant data is stored as one-frame data in the memory 9 through the memory controller 5. The image data in the memory 9 is subjected to signal processing in the DSP 11 through the memory controller 5. The resultant data is compressed by the JPEG circuit 10 and recorded on the card memory 13 through an I/F (interface) 16.

If an image display switch (not shown) is turned on, the data having undergone A/D conversion in the A/D converter 4 is directly input to the DSP 11 without being stored in the memory 9. After the data is subjected to signal processing in the DSP 11, the resultant data is output to the display unit 8 through the D/A converter 7.

Figure 2:
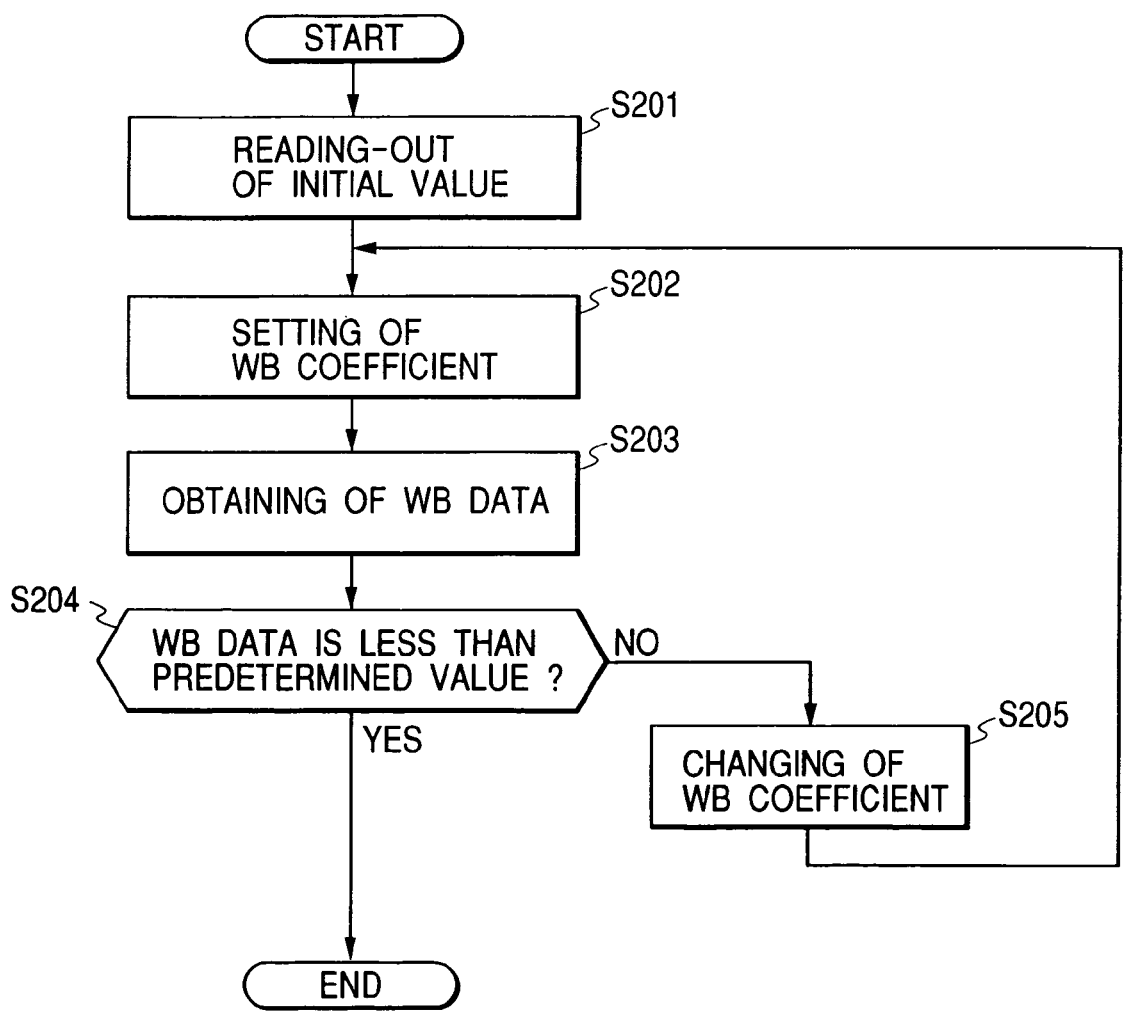
FIG. 2 is a flow chart showing the flow of white balance processing in the image pickup apparatus according to the embodiment.

Basic operation of white balance processing will be described next with reference to the flow chart of FIG. 2.

When white balance processing is started, an initial value is read out in step S201. In step S202, a white balance coefficient (WB coefficient) is set in the DSP 11 in FIG. 1. In step S203, white balance data (WB data) is obtained in accordance with the white balance coefficient set in step S202. In step S204, it is checked whether the white balance data obtained in step S203 is less than a predetermined value. If YES in step S204, the white balance coefficient is determined, and the processing is terminated.

If it is determined in step S204 that the white balance data is not less than the predetermined value, the following loop is repeated. In step S205, the value of the white balance coefficient is changed. The flow then returns to step S202 to set the white balance coefficient again. In step S203, white balance data is obtained. In step S204, it is checked whether the white balance data obtained in step S203 is less than the predetermined value.

While the current image picked by the CCD 2 is displayed on the display unit 8 in FIG. 1, the above white balance processing is consecutively performed at predetermined intervals to correct the white balance of the image displayed on the display unit 8.

White balance processing to be performed in each image pickup mode will be described next with reference to FIGS. 3A to 3D.

Figure 3A:
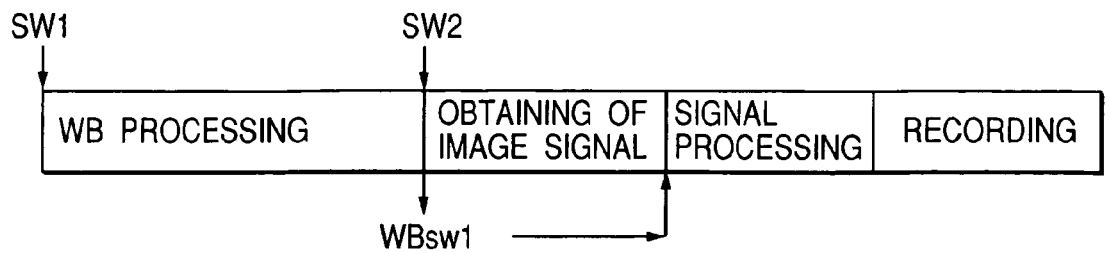
FIGS. 3A, 3B, 3C and 3D are views showing the operation timing of white balance processing in each image pickup mode of the image pickup apparatus according to the embodiment.

(1) When Display Unit 8 is on without Strobe (FIG. 3A)

The current image picked by the CCD 2 is displayed on the display unit 8, and white balance processing has already been performed consecutively before SW1. When the first switch SW1 is turned on by the release switch 14, the DSP 11 computes the white balance coefficient during the interval between SW1 and SW2 on the basis of the image signal obtained when the first switch SW1 is turned on. The computed coefficient is stored as a white balance coefficient WBsw1 in the memory 9. In this state, the second switch SW2 can be turned on, and ON operation of SW2 is inhibited until the WB processing is complete. When the second switch SW2 is turned on, the image data picked by the CCD 2 is stored in the memory 9. The image data stored in the memory 9 is subjected to signal processing using the white balance coefficient (WBsw1).

In mode (1), since the interval between SW1 and SW2 is short, the color temperature of the image signal obtained from the CCD 2 when the first switch SW1 is turned on is close to that of the image signal obtained from the CCD 2 when the second switch SW2 is turned on. For this reason, WB processing can be performed faster in this mode than in a case wherein WB processing is performed by using a predetermined value SBstd when the first switch SW1 is turned on. That is, the computation interval between SW1 and SW2 is shortened. This prevents the user from missing the shutter chance.

Figure 3B:
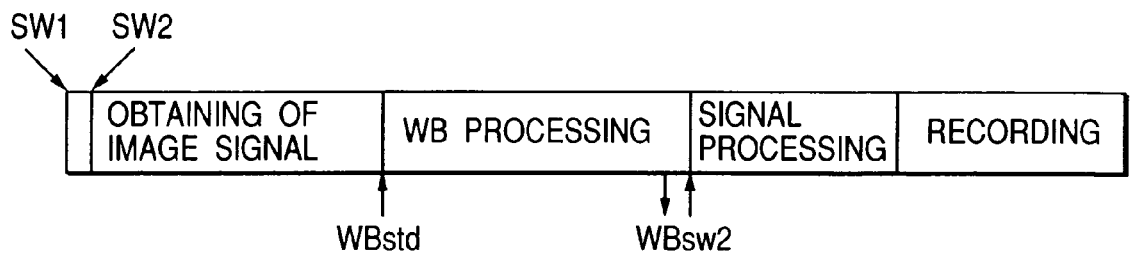

(2) When Display Unit 8 is Off without Strobe (FIG. 3B)

When the first switch SW1 is turned on by the release switch 14, the first switch SW1 can be turned on without performing white balance processing at this timing. When the second switch SW2 is turned on, the image data picked by the CCD 2 is stored in the memory 9. The DSP 11 starts white balance processing for the image data stored in the memory 9 by using a predetermined white balance coefficient WBstd as an initial value. The image data is then subjected to signal processing using a white balance coefficient (WBsw2) computed by the white balance processing.

In mode (2), since white balance processing is executed by using the predetermined white balance coefficient WBstd as an initial value, the processing time is long. However, since WB processing is executed after the image signal is obtained, i.e., the second switch SW2 is turned on, the interval between SW1 and SW2 is not prolonged. This allows the user to perform appropriate image pickup.

Figure 3C:
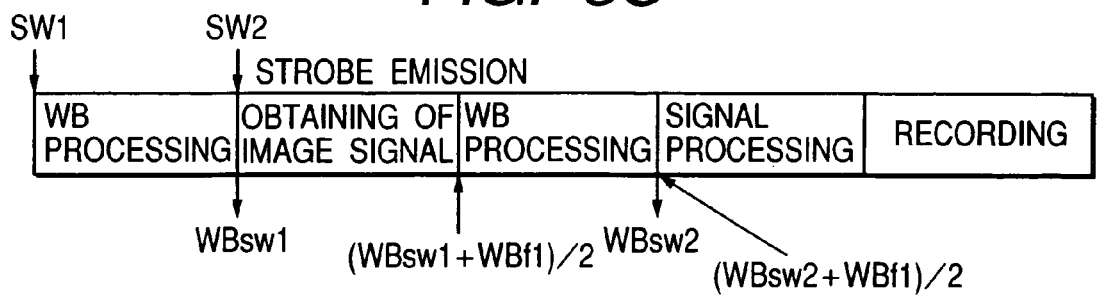

(3) When Display Unit 8 is ON with First Strobe (FIG. 3C)

The current image picked by the CCD 2 is displayed on the display unit 8, and white balance processing has been performed before SW1. When the first switch SW1 is turned on by the release switch 14, the DSP 11*a* computes the white balance coefficient during the interval between SW1 and SW2 on the basis of the image signal obtained when the first switch SW1 is turned on. This computed coefficient is stored as the white balance coefficient WBsw1 in the memory 9. In this state after computation of the white balance coefficient WBsw1, the second switch SW2 can be turned on. When the second switch SW2 is turned on, the first strobe synchronously emits light. The image data picked by the CCD 2 at this time is stored in the memory 9. White balance processing for the image data stored in the memory 9 is started by using the average value of the computed coefficient WBsw1 and predetermined strobe coefficient WBf1 as an initial value. Signal processing for the image data is then performed by using the average value of the white balance coefficient (WBsw2), obtained when this white balance processing is complete, and the white balance coefficient (WBf1) for the first strobe.

In mode (3), since the average value of the white balance coefficient WBsw1 computed before strobe emission and the white balance coefficient WBf1 for strobe emission is computed as an initial value, WB processing can be speeded up. In addition, since the average value of the white balance coefficient WBsw2 obtained by WB processing and the predetermined strobe coefficient is used as an actual white balance coefficient, color signal processing resistant to the influences of external light can be performed. This also prevents the user from missing the shutter chance.

Figure 3D:
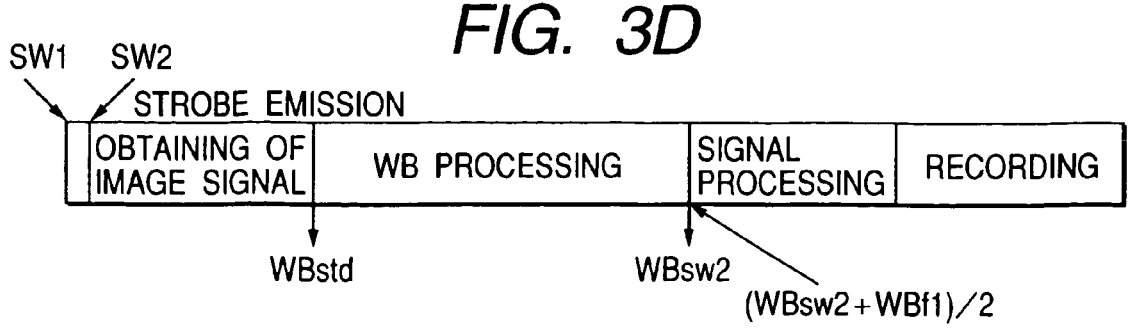

(4) When Display Unit 8 is OFF with First Strobe (FIG. 3D)

When the first switch SW1 is turned on by the release switch 14, the second switch SW2 can be immediately turned on without performing white balance processing at this timing. When the second switch SW2 is turned on, the first strobe synchronously emits light, and the image data picked by the CCD 2 is stored in the memory 9. White balance processing for the image data stored in the memory 9 is started by using the average value of the predetermined coefficient WBstd for standard light and predetermined strobe coefficient WBf1 as an initial value. Signal processing for the image data is then performed by using the average value of the white balance coefficient (WBsw2) computed by the white balance processing and white balance coefficient (WBf1) for the first strobe.

In mode (4), as in mode (2), since WB processing is executed after the second switch SW2 is turned on, the interval between SW1 and SW2 is shortened to prevent the user from missing the shutter chance. In addition, since the average value of the white balance coefficient obtained by WB processing and the predetermined strobe coefficient is used as an actual white balance coefficient, color signal processing resistant to the influences of external light can be performed.

Note that if the second strobe is mounted in place of the first strobe, a white balance coefficient (WBf2) for the second strobe is used in place of the white balance coefficient WBf1.

FIG. 4 shows the relationship between the initial value in white balance processing and the white balance coefficient for signal processing in each of image pickup modes (1) to (4) described above.

With this arrangement, a more accurate white balance coefficient can be obtained in each image pickup mode. In addition, since an initial value closer to a convergence value can be set in loop processing for white balance processing, the convergence time can be shortened.

In the first embodiment, the white balance coefficient for the strobe is stored in the EEPROM 12 in the camera body in advance. However, the present invention is not limited to this. According to another embodiment, a white balance coefficient is stored in the strobe, and the stored white balance coefficient is read out every time an image is picked up. Alternatively, this white balance coefficient may be read out from the strobe and stored in the camera body when the strobe is mounted.

According to the first embodiment described above, in modes (1) and (3), the white balance coefficient WBsw1 is computed within the interval between SW1 and SW2 on the basis of the image signal obtained when the first switch SW1 is turned on. In modes (1) and (3), however, since white balance processing has been continuously performed before the first switch SW1 is turned on, the white balance coefficient computed at the ON timing of the first switch SW1 may be used as the coefficient WBsw1. This eliminates the necessity to perform white balance processing within the interval between SW1 and SW2, and can shorten the interval between SW1 and SW2, thereby preventing the user from missing the shutter chance.

Figure 5A:
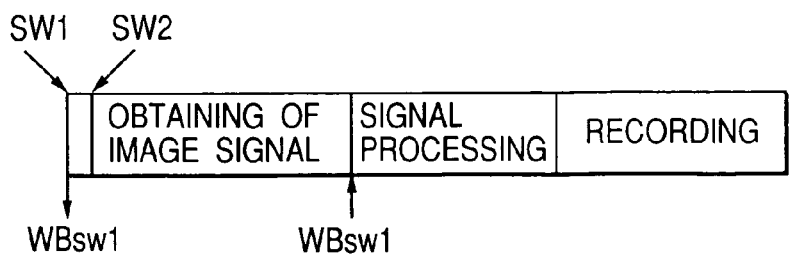
FIGS. 5A and 5B are views showing the operation timings of white balance processing and the like in image pickup modes (1) and (3) of the image pickup apparatus according to the embodiment.
Figure 5B:
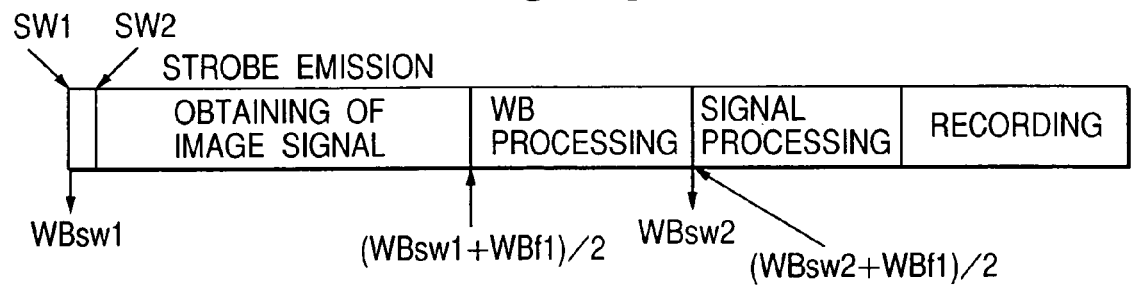
Figure 6:
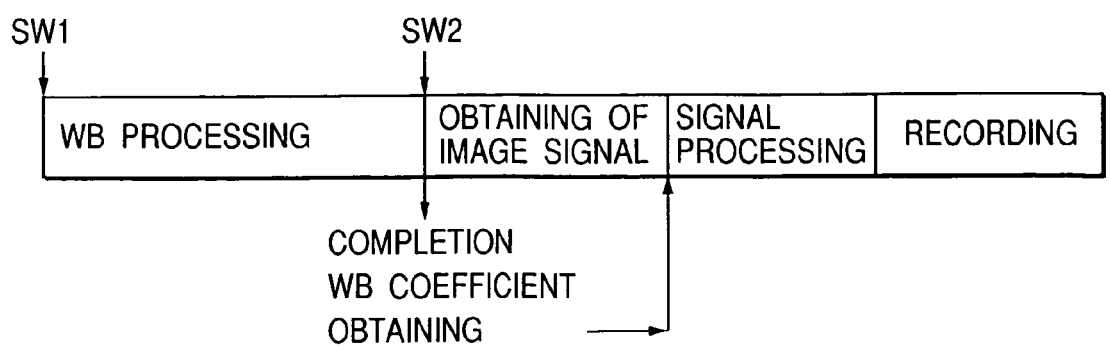
FIG. 6 is a view showing white balance processing in the prior art.

FIGS. 5A and 5B are timing charts each showing image pickup operation in such an image pickup mode. FIG. 5A is a timing chart showing image pickup operation to be performed when the display unit is ON and strobe emission is OFF. This operation corresponds to mode (1). FIG. 5B is a timing chart showing image pickup operation to be performed when both the display unit and strobe emission are ON. This operation corresponds to mode (3). Both the operations in FIGS. 5A and 5B are processed in the same manner as in the first embodiment except that the apparatus obtains the white balance coefficient WBsw1 at the timing of SW1 instead of obtaining the white balance coefficient WBsw1 within the interval between SW1 and SW2. Therefore, a description of this operation will be omitted.

In each embodiment described above, finally processed image data may be stored in the card memory 13 and displayed on the display unit 8.

In each embodiment described above, image data processed with only one white balance coefficient is recorded. However, the present invention is not limited to this, and image data processed with a plurality of different white balance coefficients may be recorded. In addition, after two different types of processed image data are displayed on the display unit 8, one of the two types of processed image data may be selected by using a selecting device (not shown), and only the selected image data may be recorded.

In each embodiment described above, the average value of the white balance coefficients WBsw2 and WBf1 is used as a white balance coefficient for signal processing for recording data when the strobe is used. However, the present invention is not limited to this. If the performance of the strobe is poor, only the white balance coefficient WBsw2 may be used.

In each embodiment described above, the external strobe mounted on the camera body has been exemplified. However, the present invention is not limited to this, and can be applied to a built-in strobe incorporated in the camera body.

In each embodiment described above, the average value of two white balance coefficients is computed. However, the present invention is not limited to this. When a white balance coefficient for the strobe is to be computed, in particular, the amount of light emitted by the strobe is detected, and the ratio of the amount of external light to the amount of light emitted by the strobe is calculated. A white balance coefficient corresponding to an internally dividing point between the white balance coefficients WBsw2 and WBf1 may be used in accordance with the calculated ratio.

As has been described in detail above, according to the image pickup method and apparatus of each embodiment described above, accurate white balance reproduction can be realized by setting an initial value and acquiring an appropriate white balance coefficient, and the loop processing time for white balance processing can be shortened.

In addition, according to the storage medium of each embodiment described above, the above image pickup apparatus can be smoothly controlled.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit. When the present invention is applied to the above storage medium, the program codes corresponding to above flow chart are stored in the storage medium. In brief, an indispensable module for the camera control system of the present invention is stored in the storage medium.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   an image pickup element for picking up an object image;
   a display unit for displaying first image data picked up by the image pickup element;
   a switch for starting recording second image data picked up by the image pickup element; and
   a control unit for effecting control so that in case the display unit is on, white balance processing is performed on the second image data on the basis of first and second correction data, and in case the display unit is off, the white balance processing is performed on the second image data on the basis of not the first correction data but the second correction data,
   wherein the first correction data is data for the white balance processing, obtained from the first image data picked up by the image pickup element before the switch is operated, and the second correction data is data for the white balance processing, obtained from the second image data picked up by the image pickup element in accordance with the operation of the switch.

2. An apparatus according to claim 1, wherein the switch is arranged so that a first operation thereof starts obtaining adjustment data based on object condition from the first image data and a second operation thereof starts recording the second image data picked up by the image pickup element.

3. An apparatus according to claim 2, wherein the object condition is information of a light source, and the adjustment data is the first correction data.

4. An apparatus according to claim 2, wherein the control unit is arranged to effect the control so that the first correction data is obtained in a time period from the first operation to the second operation.

5. An apparatus according to claim 1, further comprising a light emission unit for irradiating the object, wherein the control unit is arranged to effect the control so that the white balance processing is performed on the second image data on the basis of the first and second correction data in case the light emission unit is caused to irradiate.

6. An apparatus according to claim 5, wherein the control unit is arranged so as to effect the control so that the white balance processing is performed on the second image data on the basis of a ratio of an irradiation amount of the light emission unit and brightness of ambient light.

7. A control method for an image pickup apparatus comprising an image pickup element for picking up an object image, a display unit for displaying first image data picked up by the image pickup element and a switch for starting recording second image data picked up by the image pickup element, comprising:
   a first control step of effecting control so that white balance processing is performed on the second image data on the basis of the first and second correction data in case the display unit is on; and
   a second control step of effecting control so that the white balance processing is performed on the second image data on the basis of not the first correction data but the second correction data in case the display unit is off,
   wherein the first correction data is data for the white balance processing, obtained from the first image data picked up by the image pickup element before the switch is operated, and the second correction data is data for white balance processing, obtained from the second image data picked up by the image pickup element in accordance with the operation of the switch.

* * * * *